United States Patent Office 3,007,770
Patented Nov. 7, 1961

3,007,770
EXTRACTION OF LITHIUM
Henry C. Kawecki, Fleetwood, and Albert J. Cole, Pottstown, Pa., assignors to Kawecki Chemical Company, Boyertown, Pa., a corporation of Pennsylvania
No Drawing. Filed July 8, 1954, Ser. No. 442,218
3 Claims. (Cl. 23—33)

This invention relates to the extraction of lithium from spodumene ore and includes not only a new method for transforming this spodumene to a novel chemically reactive form but also a method of purifying this novel product.

Lithium ores are notoriously refractory. Spodumene, a lithium aluminum silicate which is generally represented by the formula $Li_2O \cdot Al_2O_3 \cdot 4SiO_2$, is a relatively common lithium ore and is particularly refractory. In fact, the naturally occurring alpha-spodumene is so unreactive that the art considers this raw material to be rendered considerably more reactive when, by heating it to a temperature within the range of about 1000° C. to 1300° C., the lithium component of the resulting beta-spodumene can be made to go into aqueous solution by roasting the beta-spodumene in admixture with concentrated sulfuric acid.

We have now discovered that beta-spodumene can be converted by a very simple procedure into solid form which can best be described as a new lithium mineral and that the lithium component of this mineral is, chemically speaking, very reactive. This conversion of beta-spodumene to the new mineral form is effected by heating the beta-spodumene in an aqueous solution of strongly alkaline compounds of sodium and potassium. Thus, our new method for converting naturally occurring alpha-spodumene to the form of a chemically reactive mineral comprises heating the alpha-spodumene in the crushed state to a temperature of at least about 1000° C. but below its fusion temperature with the resulting conversion and decrepitation of the alpha-spodumene to beta spodumene, suspending the resulting decrepitated beta-spodumene in an aqueous solution of a strongly alkaline compound of sodium or potassium containing at least 10 parts by weight of the alkaline compound per 100 parts by weight of beta-spodumene, heating the resulting slurry to a temperature at least to its boiling point, and thereafter separating the resulting solid material comprising a lithium-containing mineral the lithium component of which is chemically reactive.

This novel lithium-containing mineral can be purified pursuant to our invention by admixing the mineral with dilute sulfuric acid to effect the solubilization of the lithium component of the mineral in the form of a lithium sulfate solution, adding hydrogen peroxide to the lithium sulfate solution in amount sufficient to precipitate any dissolved iron and manganese contained in the solution, and separating any resulting precipitated iron hydroxide and manganese dioxide from the lithium sulfate solution while the latter is at a pH at least as high as 4.2 so as to obtain a substantially pure lithium sulfate slution.

In practicing the method of our invention, the step of converting alpha-spodumene to beta-spodumene is not novel and is carried out according to conventional procedure. The alpha-spodumene may be treated while admixed with other gangue constituents in the form of crushed but unbeneficiated spodumene ore or an alpha-spodumene concentrate may be used as the starting material. Any conventional wet or dry beneficiation practice may be used for the physical separation of the alpha-spodumene from the other components of the ore such as quartz and feldspar gangue. The alpha-spodumene, thus in a form at least as fine as that which results from simple crushing of the ore, is then heated in an indifferent or ambient atmosphere to a temperature of about 1000°–1300° C. Temperatures below about 1000° C. are relatively ineffective in bringing about the conversion of alpha-spodumene to beta-spodumene, and temperatures above about 1300° C. tend to promote agglomeration by fusion of the spodumene or gangue constituents. The length of this heat treatment is determined solely by the condition of the resulting product, the decrepitation of the beta-spodumene (but not of the gangue constituents) being visible evidence of effective conversion of the alpha-spodumene to beta-spodumene.

The resulting decrepitated beta-spodumene, after its separation from the relatively coarse non-decrepitated gangue constituents if the latter are present during this conversion step, is then converted to the new reactive lithium mineral pursuant to our invention. This conversion is effected by heating the beta-spodumene while suspending it in an aqueous solution of a strongly alkaline compound of sodium or potassium. The beta-spodumene may thus either be slurried with water and the alkaline compound then added to the slurry, or the beta-spodumene may be slurried with the alkaline compound solution itself. In either event, the amount of water required during this conversion step is merely that which is necessary to form a fluid slurry of the beta-spodumene.

The alkaline compound of sodium or potassium used to convert the beta-spodumene to a chemically reactive lithium-containing mineral pursuant to our invention is preferably either the hydroxide or carbonate of sodium or potassium. The amount of this alkaline compound which is useful in effecting such conversion may vary widely. For example, we have found that as little as 10 parts by weight of sodium or potassium hydroxide per 100 parts by weight of beta-spodumene are effective in converting the beta-spodumene to the new chemically reactive form and that solutions containing as much as 100 parts by weight of the hydroxide per 100 parts by weight of beta-spodumene are also effective. Similar amounts of the carbonates of sodium and potassium are also effective. Actually, when used in amounts of at least 10% by weight of the beta-spodumene, the amount of alkaline compound which is used affects only the time required to effect the conversion of the beta-spodumene to the new mineral form. For example, in order to effect conversion of 90% of the beta-spodumene to the chemically active mineral form in boiling sodium hydroxide solutions, and expressed in terms of parts by weight per 100 parts of beta-spodumene, 15 parts of the hydroxide requires a 16-hour conversion period, whereas 20 parts of the hydroxide reduces the conversion period to 8 hours and 25 parts of the hydroxide effects the conversion in about 4½ hours. In order to convert 85% of the beta-spodumene to the chemically active form, and again expressed as parts by weight of sodium hydroxide per 100 parts of beta-spodumene in boiling water, 10 parts of the hydroxide requires a 24-hour conversion period, 15 parts of the hydroxide lowers the conversion period to 4½ hours, 25 parts of the hydroxide still further lowers the conversion period to 3¾ hours, and 50 parts of the hydroxide effects the conversion in only 2 hours. In order to increase the conversion above about 95%, 20 parts of sodium hydroxide, expressed as hereinbefore, requires a conversion period of 15 hours, 25 parts of the hydroxide lowers the conversion period to 5 hours, and 50 parts of the hydroxide effects the conversion in only 1 hour. It will be readily appreciated, therefore, that the concentration of the sodium hydroxide solution (which is representative of the other useful solutions mentioned heretofore) and the length of the conversion period are inversely related to one another and that the actual concentration of the alkaline compound of sodium or potassium which is used for this conversion is not critical provided it is used in amount of at least about 10% by weight of the beta-spodumene.

The temperature required to effect this conversion also influences the time required to effect the conversion. In general, the higher the temperature the shorter the conversion period, and for this reason we presently prefer to use reaction temperatures which are close to, and are advantageously at, the boiling point of the alkaline compound solution. Thus, in order to carry out this conversion, the only special requirement for the conversion apparatus is that it be capable of withstanding the corrosive effect of boiling strongly alkaline solutions.

The chemical change which takes place as the beta-spodumene is converted to the new chemically reactive lithium mineral form appears to comprise primarily the introduction of some alkali metal oxide into the lithium mineral and the elimination of some of the silica component of the spodumene. In general, although the silica loss in converting the beta-spodumene to the new reactive mineral ranges only from a few percent to as high as about 20%, dependent primarily upon the concentration of the alkaline treating solution, the new lithium-containing material exhibits a net weight gain which is usually within the range of from 10 to 15%, attributable exclusively to the introduction of sodium oxide or potassium oxide into the solid lithium material. The new chemically active mineral is virtually as insoluble in the aqueous alkaline treating medium as the beta-spodumene, and therefore the recovery of the new mineral involves simply its separation from the aqueous medium. Depending upon the subsequent treatment to which the new mineral is to be subjected, it may or may not be washed with water to remove entrained sodium or potassium silicate solution. Incidentally, this silicate solution separated from the new lithium mineral may be treated by adding lime thereto with the resulting precipitation of calcium silicate and regeneration of a sodium hydroxide solution which can be used to convert the beta-spodumene to our new lithium mineral.

The chemical reactivity of the new lithium-containing mineral which is produced pursuant to our invention is clearly evidenced by the fact that although beta-spodumene will react with concentrated sulfuric acid only under roasting conditions, the new mineral will readily react with very dilute (10% or less) sulfuric acid either in the cold or when heated. In fact, the reactivity of the new lithium-containing mineral with dilute sulfuric acid is used to advantage in our novel procedure for transforming this mineral to a substantially pure lithium compound. That is, we have found that the new lithium-containing mineral reacts with the sulfuric acid to form a lithium sulfate solution which can then be freed not only from the residual insoluble components of the new mineral but also from the other acid-soluble mineral components which may contaminate this lithium sulfate solution.

Our purification procedure for transforming our novel lithium mineral to a substantially pure lithium compound comprises first dissolving the lithium component of the mineral in sulfuric acid. Although this dissolution can be effected with concentrated sulfuric acid, the reactivity of the lithium is such that it is safer to use dilute sulfuric acid. For this purpose, we have found it generally satisfactory to slurry the new lithium mineral with water and then add relatively concentrated sulfuric acid to this slurry. The amount of acid required for this solubilization of the lithium component of the new mineral is merely that which will effect permanent acidification of the resulting aqueous medium. The solubilization of the lithium can be accelerated by heating the aqueous reaction medium, although the reaction will proceed somewhat more slowly at normal ambient temperature. Completion of the reaction is thus indicated by the development of a permanent acidic pH value in the aqueous reaction medium.

In effecting dissolution of the lithium component of the new lithium mineral by its reaction with sulfuric acid, we have found that the aluminum present in the mineral will not enter into the solution to any significant extent if the ultimate pH of the reaction medium is not lowered below about 4.2. If a lower pH is inadvertently or intentionally attained, the aluminum which thereupon goes into solution may be readily thrown out of solution by neutralizing the aqueous medium with ammonia until the pH rises to at least about 4.2. The resulting acidic solution of lithium sulfate which is obtained when the pH of the solution is maintained below 7 but not below about 4.2 contains, in addition to the lithium sulfate, a significant amount of iron and manganese which were initially present in the spodumene ore. Both the iron and the manganese are promptly removed from the solution by adding thereto sufficient hydrogen peroxide to precipitate the iron as ferric hydroxide and to precipitate the manganese as manganese dioxide. If the lithium sulfate solution is acidulated to a pH below 4.2, the subsequent precipitation of the dissolved aluminum by ammoniation and the precipitation of any iron and manganese by the addition of hydrogen peroxide may be effected simultaneously. The precipitation of all of these impurities takes place readily at ambient room temperature, but in order to expel any excessive ammonia or hydrogen peroxide from the solution we have found it advantageous to heat the solution to the boiling point. By using ammonia, either in the gaseous form or as ammonium hydroxide, and by using hydrogen peroxide, the reagents required for the precipitation of any dissolved aluminum, iron and manganese leave no extraneous element in the solution which cannot be removed by the aforementioned boiling step. Consequently, the resulting aqueous medium consists of a substantially pure solution of lithium sulfate which can be separated from any precipitated aluminum, iron or manganese by conventional filtration or decantation procedure.

The lithium sulfate component of the resulting lithium sulfate solution may be obtained simply by evaporation and consequent crystallization of the lithium sulfate. The only contaminant of this lithium sulfate is a small amount of either sodium or potassium which was introduced into the lithium material during its conversion from beta-spodumene to our new chemically reactive lithium mineral. On the other hand, the lithium component of the lithium sulfate solution may be precipitated in the form of the highly insoluble pure lithium fluoride by adding to the lithium sulfate solution a soluble fluoride such as ammonium fluoride, ammonium bifluoride or hydrofluoric acid. Sodium fluoride can be used for this purpose, although its solubility in the aqueous solution is rather limited, and potassium fluoride may also be used although it is more expensive than the other mentioned soluble fluorides. The lithium component of the sulfate solution may also be precipitated in the form of substantially pure lithium carbonate by adding to the solution a soluble carbonate such as soda ash, followed advantageously by evaporation concentration of the resulting aqueous medium in order to effect crystallization of the somewhat soluble lithium carbonate. The lithium component of the sulfate solution can be readily precipitated in the form of pure lithium phosphate by adding a solution of trisodium phosphate to the lithium sulfate solution.

The following specific examples are illustrative of the practice of our invention.

Example I

Spodumene ore was crushed to about one inch average particle size and was then heated to approximately 1000° C. in an electrically heated furnace with a minimum of rabbling or agitation. After the ore had attained this temperature, it was allowed to cool in the ambient atmosphere, whereupon decrepitation of the beta-spodumene formed by the aforementioned heating step took place. The cooled product was then agitated gently in water, and the finely divided beta-spodumene was decanted through a 20 mesh (Tyler Standard) screen. The decanted fines comprised beta-spodumene. Approximately equal parts by weight of the finely divided beta-spodumene and water were then gently agitated to form a slurry, and 25 parts by weight of 76–78% caustic soda per 100 parts of the beta-spodumene were added to this slurry. The resulting mass was then heated to its boiling temperature and was maintained at this temperature for a period of about 6 hours. The hot slurry was then filtered, and the filter cake comprised our novel lithium-containing mineral which is characterized by its chemical reactivity. This mineral showed by chemical analysis a loss of 11.0% of the silica component of the beta-spodumene and a net weight gain of 14.5% attributable essentially to introduction of sodium oxide into the new lithium-containing material.

The new lithium mineral in the form of the aforementioned filter cake was then slurried with about 300 parts by weight of water and the slurry was heated to its boiling temperature. Approximately 33 parts by weight of 98% sulfuric acid were added to the boiling solution very slowly while maintaining agitation of the slurry. By the time that all of this sulfuric acid had been added, the pH of the aqueous medium had dropped to about 4.0. Gentle agitation was continued while maintaining the acidified slurry at its boiling point for an additional hour. The resulting slurry was then filtered and the filter cake was washed thoroughly with boiling water. The filtrate and washings were combined and comprised a lithium sulfate solution containing in excess of 95% of the lithium content of the initial alpha-spodumene. About 1 part of hydrogen peroxide per 100 parts of the alkaline solution was added and the solution was then heated to its boiling point to expel any excess hydrogen peroxide. The solution was then cooled and filtered to remove precipitated aluminum hydroxide, ferric oxide and manganese dioxide. The filtrate comprised a solution of lithium sulfate contaminated only with a small amount of sodium sulfate.

The lithium component of the lithium sulfate solution was then converted to pure lithium fluoride by adding an ammonium fluoride solution to the lithium sulfate solution. Crystals of lithium fluoride formed immediately and were separated and washed on a filter.

Example II

The procedure described in Example I was repeated using 33 parts by weight of soda ash in lieu of the 25 parts of sodium hydroxide used in Example I for converting the beta-spodumene to the new chemically active lithium mineral. The recoveries and results were substantially the same as those reported in Example I. Repeating this procedure with 66 parts by weight of soda ash per 100 parts of beta-spodumene produced substantially identical results even when the beta-spodumene was boiled in this concentrated soda ash solution for 22 hours.

It will be appreciated, accordingly, that we have developed a procedure for rendering chemically reactive the lithium component of spodumene so as to make this lithium ore more readily usable. The novel lithium-containing mineral which we obtain by this procedure is more chemically active than any other known lithium mineral, and makes possible the subsequent conversion of this lithium material into substantially pure lithium compounds by a relatively simple procedure.

We claim:

1. The method of solubilizing and purifying the lithium component of naturally occurring alpha-spodumene which comprises first converting the chemically inert lithium component of the alpha-spodumene to a chemically active form by heating the spodumene in the crushed state to a temperature of at least about 1000° C. but below its fusion temperature with the resulting conversion and decrepitation of the alpha-spodumene to beta-spodumene, then suspending the resulting decrepitated beta-spodumene in an aqueous solution of an alkaline compound of an alkali metal of the group consisting of sodium and potassium containing at least 10 parts by weight of said alkaline compound per 100 parts by weight of beta-spodumene, heating the resulting slurry to a temperature at least close to its boiling point, and thereafter separating the resulting solid material comprising a lithium-containing product the lithium component of which is chemically active; thereupon admixing the active lithium-containing product with dilute sulfuric acid with the resulting solubilization of the lithium component of the product in the form of a lithium sulfate solution, adding hydrogen peroxide to the lithium sulfate solution in amount sufficient to precipitate any dissolved iron and manganese contained in the solution, and separating any resulting precipitated iron hydroxide and manganese dioxide from the lithium sulfate solution while the latter is at a pH at least as high as 4.2 so as to obtain a substantially pure lithium sulfate solution.

2. The method of solubilizing and purifying the lithium component of naturally occurring alpha-spodumene which comprises first converting the chemically inert lithium component of the alpha-spodumene to a chemically active form by heating the spodumene in the crushed state to a temperature of at least about 1000° C. but below its fusion temperature with the resulting conversion and decrepitation of the alpha-spodumene to beta-spodumene, then suspending the resulting decreptitated beta-spodumene in an aqueous solution of an alkaline compound of an alkali metal of the group consisting of sodium and potassium containing at least 10 parts by weight of said alkaline compound per 100 parts by weight of beta-spodumene, heating the resulting slurry to a temperature at least close to its boiling point, and thereafter separating the resulting solid material comprising a lithium-containing product the lithium component of which is chemically active; thereupon admixing the active lithium-containing product with an amount of dilute sulfuric acid sufficient to effect solubilization of the lithium component of the product in the form of a lithium sulfate solution having an acid pH not lower than about 4.2, adding hydrogen peroxide to the lithium sulfate solution in amount sufficient to precipitate any dissolved iron and manganese contained in the solution, and separating any resulting precipitated iron hydroxide and manganese dioxide from the lithium sulfate solution while the latter is at a pH at least as high as 4.2 so as to obtain a substantially pure lithium sulfate solution.

3. The method of solubilizing and purifying the lithium component of naturally occurring alpha-spodumene which comprises first converting the chemically inert lithium component of the alpha-spodumene to a chemically active form by heating the spodumene in the crushed state to a temperature of at least about 1000° C. but below its fusion temperature with the resulting conversion and decrepitation of the alpha-spodumene to beta-spodumene, the suspending the resulting decrepitated beta-spodumene in an aqueous solution of sodium hydroxide containing at least 10 parts by weight of caustic alkali per 100 parts by weight of beta-spodumene, heating the resulting slurry to a temperature at least close to its boiling point, and thereafter separating the resulting solid material comprising a lithium-containing product the lithium component of which is chemically active; thereupon admixing the active lithium-containing product with an amount of dilute sulfuric acid sufficient to effect solubilization of the lithium component of the product in the form of a lithium sulfate solution having an acid pH not lower than about 4.2, adding hydrogen peroxide to the lithium sulfate solution in amount sufficient to precipitate any dissolved iron and manganese contained in the solution, and separating any resulting precipitated iron hydroxide and manganese dioxide from the lithium sulfate solution while the latter is at a pH at least as high as 4.2 so as to obtain a substantially pure lithium sulfate solution.

References Cited in the file of this patent

UNITED STATES PATENTS

| | | |
|---|---|---|
| 1,100,675 | Hackl et al. | June 16, 1914 |
| 1,269,914 | Ellis et al. | June 18, 1918 |
| 1,305,969 | Jackson | June 3, 1919 |
| 2,020,854 | Rosett | Nov. 12, 1935 |
| 2,024,026 | Coleman | Dec. 10, 1935 |
| 2,413,644 | Nicholson | Dec. 31, 1946 |
| 2,662,809 | Kroll | Dec. 15, 1953 |